UNITED STATES PATENT OFFICE.

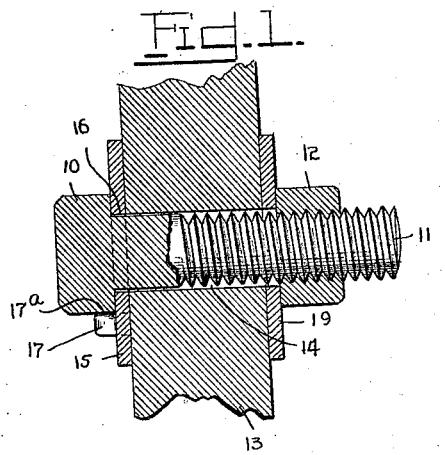
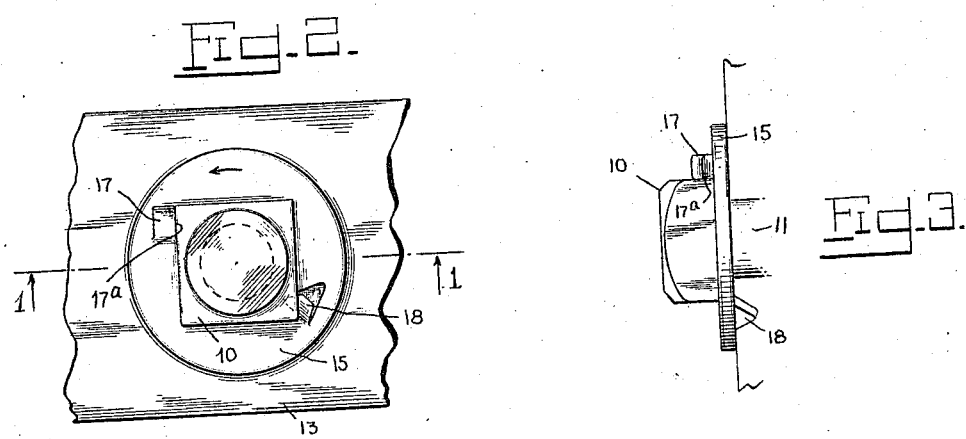
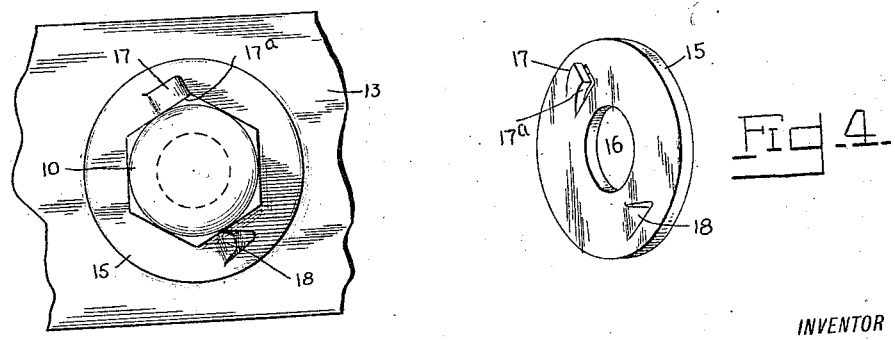

GUS LARSON, OF NEW YORK, N. Y., ASSIGNOR TO HARRY HOGG, OF NEW YORK, N. Y.

BOLT-LOCKING DEVICE.

1,414,140.   Specification of Letters Patent.   Patented Apr. 25, 1922.

Application filed February 17, 1921. Serial No. 445,883.

*To all whom it may concern:*

Be it known that GUS LARSON, subject of Sweden, residing at New York city, New York, has invented new and useful Improvements in Bolt-Locking Devices, of which the following is a specification.

My invention relates to improvements in bolt locking devices and has reference more particularly to that type wherein a metal disk provided with suitably disposed lugs is interposed between the head of a bolt and its bed, to arrest rotary movement of the bolt in either direction.

Devices of this general character have been heretofore proposed but in these devices in order to permit the nut to function the lugs on one surface of the washer were necessarily depressible, so that the nut might turn about the stem of the bolt, when the nut is tightened or loosened. Such a construction locks the nut against movement but does not prevent the bolt from rotating while the nut is being tightened or loosened thereon; in other words, by the use of the ordinary lock washer between the nut and the bed holding the bolt, it is impossible to prevent the latter from turning, as the nut is being turned. A wrench may be employed to hold the head of the bolt against movement, but under many circumstances this is impracticable and may require the service of two operators, especially if the stem of the bolt is of considerable length.

To overcome the above objections, the present invention contemplates the provision of a flat disk, preferably constructed of metal, having a central opening to receive the stem of a bolt. Projecting from opposite surfaces of the disk are lugs sufficiently rigid to remain immovable even when subjected to very great strain. This locking device is simple in construction and has the advantage of being applicable to any of the common types of bolts having polygonal heads. A disk of this kind may be used either against a bed of wood or of metal. In the latter case, the projection or tooth on the under side of the disk would be sufficiently sharp to enable it to bite into the adjacent metal surface.

The invention consists in the features hereinafter fully described with reference to the accompanying drawing, wherein Fig. 1 is a substantially cross sectional view through a bed having a bolt seated therein and taken on the lines 1—1 of Fig. 2.

Fig. 2 is a front elevational view of the head of a bolt engaged by the locking device.

Fig. 3 is a side elevational view of the parts shown in Fig. 2.

Fig. 4 is a perspective view of the locking disk.

Fig. 5 is a view similar to that of Fig. 2 except that a hexagonal head is shown engaged by the locking disk.

Referring to the drawing 10 denotes the head of a bolt having the usual threaded stem 11 and nut 12. A base or bed is indicated at 13 and may be either of wood or metal, and provided with an opening 14 to receive the stem 11 of the bolt.

Interposed between the under side of the bolt head 10 and the surface of the base 13 is a locking disk 15. As shown in Fig. 4, this disk comprises a metal washer having a central opening 16 through which the stem 11 passes. Protruding from the exposed surface of the disk 15 is a preferably rectangular lug 17 struck up from the material of the disk and having a straight inner wall 17$^a$ perpendicular or substantially so to the plane of the disk. The wall 17$^a$ presents a surface to be engaged by one of the facets of the bolt head 10. As shown in Figs. 2 and 3, the lug 17 is located in such a position upon the disk 15 as to receive a square headed bolt, while in Fig. 5 the position of the lug 17 is such that it engages one of the walls or facets of the hexagonal bolt head 10. Projecting from the under surface of the disk 15 is a radially disposed triangular tooth 18. The tooth 18 is inclined outwardly and in a direction parallel to the lug 17 which is diametrically opposite to the tooth 18.

It will be understood that more than one tooth 18 may be provided, especially if the teeth are to take against a comparatively hard surface. In that case the teeth 18 would necessarily be shorter than the single tooth and treated to give them sufficient hardness to enable their points to bite into the bed 13. It is desirable to provide a flat washer 19 at the opposite end of the bolt, between the bed 13 and the nut 12.

In arranging the locking disk 15 in its proper position for use, the disk is first passed over the stem 11 of the bolt. The surface having the lug 17 is passed into engagement with the under face of the head 10 of the bolt. The stem 11 is then introduced into the opening 14 in the base or bed 13 and the washer 19 arranged over the protruding end at the opposite side of the bed 13. The nut 12 is then placed upon the threaded end of the bolt and screwed down against the washer 19. It will be apparent that as the nut 12 is tightened the head 10 of the bolt will be drawn against the locking disk 15 compelling the latter to move against the opposing surface of the bed 13 and forcing the tooth 18 to bite into the former.

The natural tendency of the bolt under this condition is to rotate with the nut, but due to the peculiar arrangement of the lug 17 and tooth 18, one of the corners of the head 10 of the bolt will abut against the straight surface 17$^a$ of the lug 17. Simultaneously with this inward movement of the disk 15 there will be a slight arcuate movement of the latter, which will effectively embed the tooth 18 into the base 13. This is due to the fact that the end of the tooth 18 is inclined in the direction of rotation of the nut, i. e. toward the left, as indicated by the arrow in Fig. 2. Therefore, the point of the tooth 18 will be forced beneath the surface of the base 18 and the displaced portion of the base 13 will be forced into the wedge shaped space between the inclined surface of the tooth 18 and the disk 15. The successful operation of this feature of my invention is made possible by the arrangement of the tooth 18 which has its widest portion counter to the general direction of movement of the nut 12.

In other devices of this character the teeth have been arranged so that their widest part is concentric with the general direction of movement of the nut and due to the yielding character of the projections on the opposite surface of the washer, adjacent the nut, sufficient purchase is secured by contact with the bed to lock the washer. Where a locking device is used to temporarily arrest movement of a nut it will be understood that the edges of the projections must be inclined so that they may be pressed backwardly and then spring outwardly to normal position as the corners of the moving nut release them. But in my bolt locking device the bolt head is prevented from moving relative to the disk 15 by the rigidly disposed lug 17 which is in the path of the possible movement of the corners of the bolt head 10.

I claim:—

A bolt lock comprising a metal disk having a central opening to receive the stem of a bolt, a rigid lug projecting from the outer surface of the disk and having a straight inner edge to abut against one of the said faces of a polygonal bolt head, whereby the bolt will be held against turning in either direction, and an inclined tooth projecting from the inner surface of said disk and arranged radially and adapted to be imbedded in the opposed surface of a base surrounding said bolt, said tooth being tapered and extending in a direction corresponding substantially to the general direction of movement of a nut so that the tendency of the nut to rotate the bolt when tightened down will operate to force the lug into engagement with the base and hold the disk and the bolt against turning.

In testimony whereof, Gus Larson has signed his name to this specification in the presence of two subscribing witnesses, this 14th day of February 1921.

GUS LARSON.

Witnesses:
ARTHUR BESWICK,
JOHN F. NOLAN.